US010606619B2

(12) United States Patent
Khudia et al.

(10) Patent No.: US 10,606,619 B2
(45) Date of Patent: Mar. 31, 2020

(54) SMART SUPPORT

(71) Applicant: Microsoft Technology Licensing, LLC, Redmond, WA (US)

(72) Inventors: Akashdeep Khudia, Sammamish, WA (US); Srinivasa Reddy Manda, Issaquah, WA (US); Andrew James Peacock, Seattle, WA (US); Russell Simpson, Clyde Hill, WA (US); David Paul Limont, Vashon, WA (US); Zohaib Ali, Mill Creek, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 15/628,465

(22) Filed: Jun. 20, 2017

(65) Prior Publication Data

US 2018/0365027 A1    Dec. 20, 2018

(51) Int. Cl.
*G06F 9/451* (2018.01)
*G06F 11/07* (2006.01)
(Continued)

(52) U.S. Cl.
CPC .......... *G06F 9/453* (2018.02); *G06F 11/0706* (2013.01); *G06F 16/00* (2019.01); *G06Q 30/016* (2013.01)

(58) Field of Classification Search
CPC .... G06F 9/453; G06F 11/0706; G06Q 30/016
See application file for complete search history.

(56) References Cited

U.S. PATENT DOCUMENTS 5,263,167 A * 11/1993 Conner, Jr. ............. G06F 9/451
5,513,308 A *  4/1996 Mori ....................... G06F 9/453
                                                    715/707
(Continued)

FOREIGN PATENT DOCUMENTS

EP    3035252 A1    6/2016
WO    2015171581 A1    11/2015

OTHER PUBLICATIONS

Dong, et al., "A Self-Recovery Method Based on Mixed Reboot", In Proceedings of the Fifth International Conference on Autonomic and Autonomous Systems, Apr. 20, 2009, pp. 56-62.
(Continued)

*Primary Examiner* — Roland J Casillas
(74) *Attorney, Agent, or Firm* — Michael Best & Friedrich LLP

(57) ABSTRACT

Techniques and technologies for smart support systems are described. In at least some embodiments, a method comprises: receiving an indication of a user invoking a support facility due to a problem experienced with a software application; obtaining user-related information including at least one of an age of the user or at least one indication of proficiency of the user with operation of the software application; obtaining problem-related information related to the problem experienced with the software application; and selecting a starting point of a support path based at least partially on the problem-related information and the user-related including at least one of an age of the user or at least one indication of proficiency of the user with operation of the software application, the support path defining one or more operations intended to address the problem experienced with the software application.

20 Claims, 5 Drawing Sheets

(51) Int. Cl.
*G06F 16/00* (2019.01)
*G06Q 30/00* (2012.01)

(56) References Cited

U.S. PATENT DOCUMENTS

| | | | |
|---|---|---|---|
| 5,774,118 A * | 6/1998 | Hatakama | G06F 9/453 |
| | | | 715/707 |
| 6,681,344 B1 | 1/2004 | Andrew | |
| 7,137,034 B2 | 11/2006 | Largman et al. | |
| 7,523,340 B2 | 4/2009 | Muthukumarasamy et al. | |
| 9,009,085 B2 | 4/2015 | Boyle et al. | |
| 10,147,424 B1 * | 12/2018 | Indyk | G06F 16/338 |
| 2005/0015678 A1 | 1/2005 | Miller | |
| 2007/0036329 A1 | 2/2007 | Joseph et al. | |
| 2007/0157092 A1 * | 7/2007 | Wadhwa | G06F 9/453 |
| | | | 715/707 |
| 2009/0271232 A1 * | 10/2009 | Waguet | G06Q 10/06 |
| | | | 705/7.36 |
| 2011/0047404 A1 | 2/2011 | Metzler et al. | |
| 2012/0191629 A1 | 7/2012 | Shae et al. | |
| 2014/0052645 A1 | 2/2014 | Hawes et al. | |
| 2014/0236934 A1 * | 8/2014 | Boyle | G06F 17/289 |
| | | | 707/723 |
| 2014/0330783 A1 | 11/2014 | Provencher et al. | |
| 2017/0124184 A1 * | 5/2017 | Podgorny | G06N 7/005 |

OTHER PUBLICATIONS

"International Search Report and Written Opinion Issued in PCT Application No. PCT/US2018/033991", dated Oct. 11, 2018, 12 Pages.

\* cited by examiner

SMART SUPPORT

BACKGROUND

Many commercial enterprises employ customer support centers that receive incoming requests for assistance from users that are experiencing issues with products. For example, a company that develops and sells a software application may operate a support center that receives online requests for assistance from users that are experiencing an issue involving the software application installed on the user's computing device. Conventional support systems typically route all incoming requests for assistance to a common starting point from which the user begins a process of trying to reach a resolution of their particular issue. Although desirable results have been achieved using such conventional support systems, there may be considerable room for improvement.

SUMMARY

Techniques and technologies for a support systems are described that may provide considerable advantages over conventional systems. For example, in at least some implementations, a system configured to provide support in response to requests for assistance, comprises: a processing component operatively coupled to a memory; a support engine at least partially stored on the memory, the support engine including one or more instructions executable by the processing component configured to perform one or more operations including at least: receiving an assistance request indicating an issue associated with a software application operating on a client device, the assistance request being associated with a particular requester attempting to address the issue associated with the software application; determining issue-related information associated with the issue indicated by the assistance request associated with the software application; determining requester information associated with the particular requester including at least one of an age of the particular requester or at least one indication of proficiency of the particular requester with operation of the software application; selecting a starting point of a support path associated with the assistance request based at least partially on the issue-related information and the requestor information including at least one of an age of the particular requester or at least one indication of proficiency of the particular requester with operation of the software application, the support path defining one or more operations to be performed to provide at least one support solution responsive to the assistance request.

Alternately, in at least some embodiments, a system configured for providing support, comprises: circuitry configured to receive an indication of a user invoking a support facility due to a problem experienced with a software application; circuitry configured for obtaining user-related information including at least one of an age of the user or at least one indication of proficiency of the user with operation of the software application; circuitry configured for obtaining problem-related information related to the problem experienced with the software application; circuitry configured for selecting a starting point of a support path based at least partially on the problem-related information and the user-related including at least one of an age of the user or at least one indication of proficiency of the user with operation of the software application, the support path defining one or more operations intended to address the problem experienced with the software application.

In at least some further embodiments, a method of providing support comprises: receiving an indication of a user invoking a support facility due to a problem experienced with a software application; obtaining user-related information including an age of the user and at least one indication of proficiency of the user with operation of the software application; obtaining problem-related information related to the problem experienced with the software application; and selecting a starting point of a support path based at least partially on the problem-related information and the user-related including at least one of an age of the user or at least one indication of proficiency of the user with operation of the software application, the support path defining one or more operations intended to address the problem experienced with the software application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

DETAILED DESCRIPTION

The present disclosure describes techniques and technologies for a smart support system. As described more fully below, in at least some implementations, a support system in accordance with the present disclosure may advantageously receive an assistance request, and may improve computational efficiency of the support system by intelligently selecting a starting point for providing support based at least partially on information characterizing the requester (e.g. age, proficiency of the requester, etc.). Accordingly, techniques and technologies in accordance with the present disclosure may improve efficiency of support systems by appropriately tailoring the provision of support to the expertise and personal characteristics of the requester.

Figure 1:
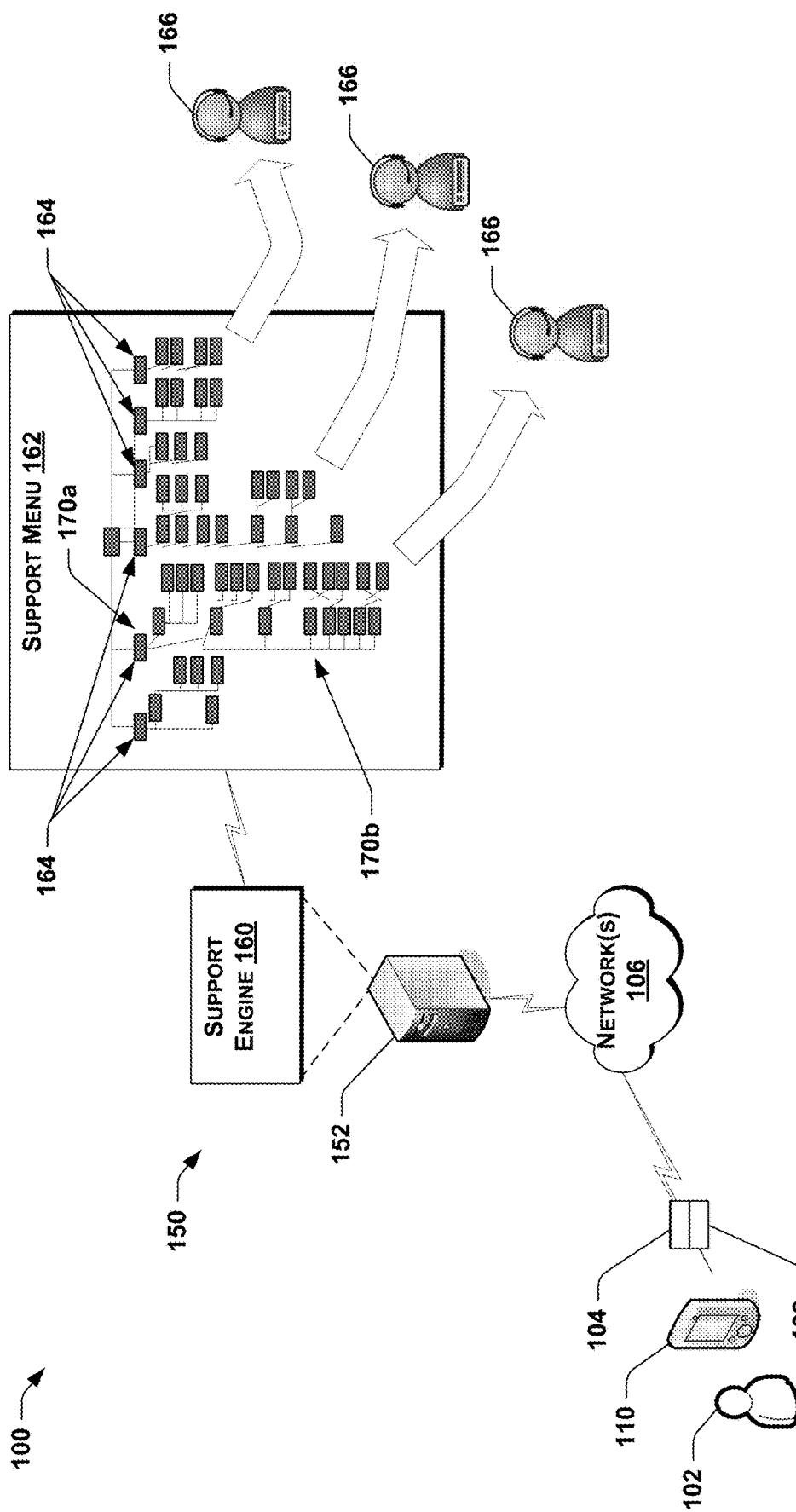
FIG. 1 shows an embodiment of an environment for a support system.

FIG. 1 shows an embodiment of an environment 100 for a support system 150 in accordance with the present disclosure. In this embodiment, the environment 100 includes a client device 110 that is configured to communicate with a support server 152 of the support system 150 via one or more networks 106. The support system 150 includes a support engine 160 installed on the support server 152 that is configured to provide automated (or semi-automated) support to a requester 102. The support engine 160 includes an automated support menu 162 that includes a plurality of channels (or branches) 164 into which the requestor 102 may be routed in order to resolve an issue that the requestor 102 is experiencing, such as with problems associated with installation or operation of a software application installed on the client device 110.

In at least some implementations, the automated support menu 162 may include an Interactive Voice Response (IVR) system. IVR systems are generally known and typically use a computing device to interact with callers through voice recognition or through tones (e.g. Dual-tone Multi-Frequency (DTMF) signals, etc.) that may be generated by the requestor 102 pressing various keys on a keypad of the client device 110. Alternately, the automated support menu 162 may be based on written communications between the requestor 102 and the support engine 160 (e.g. texts, emails, etc.), or may be based on selections or responses to prompts from the support engine 160, or any other suitable techniques.

It will be appreciated that in some instances, an issue that the requestor 102 is experiencing may be resolved by having the requestor 102 follow one or more operations (or steps) of a particular channel 164 of the support menu 162 (e.g. such as by having automated prompts that request information from the requestor 102 and, in turn, provided automated instructions to the requestor 102 to resolve the issue). In at least some implementations, however, at least some of the branches 164 may eventually lead to a technical support person 166 for communication and assistance.

More specifically, as further shown in FIG. 1, the requestor 102 may transmit an assistance request 104 from the client device 110 via the one or more networks 106 to the support system 150. Support information 108 is also transmitted (e.g. pushed or pulled) to the support system 150 that supplements the assistance request 104. The assistance request 104 and the support information 108 are provided to the support engine 160, which is configured to analyze the assistance request 104 and the support information 108 to determine an appropriate starting point 170 in the support menu 162 into which the requestor 102 is to be routed for resolution of the issue. For example, in some instances, the support engine 160 may determine, based on the assistance request 104 and the support information 108, that the requestor 102 is relatively inexperienced and should be started at a starting point 170a in the support menu 170 that is appropriate for a relatively inexperienced user. Alternately, in some other instances, the support engine 160 may determine that the requestor 102 can avoid several operations (or steps) that are suitable for an inexperienced user, and instead should begin at a more advanced starting point 170b appropriate for a more experienced user.

In the environment 100 shown in FIG. 1, the client device 110 is depicted as a mobile device such as a cellular telephone. It will be appreciated, however, that in other embodiments, the client device 110 may be any other suitable type of device, such a Personal Data Assistant (PDA), a notebook computer, a tablet computer, a slate computer, a laptop computer, a smart watch, or any other portable or hand-held device. Alternately, in still other embodiments, the client device 110 may be a desktop computing device, a mainframe (or server) device, a vehicle (e.g. automobiles, robotic vehicles, aircraft, watercraft, trains, subways, etc.), a household appliance, a device associated with the Internet of Things (IoT), or any other suitably configured device.

Figure 2:
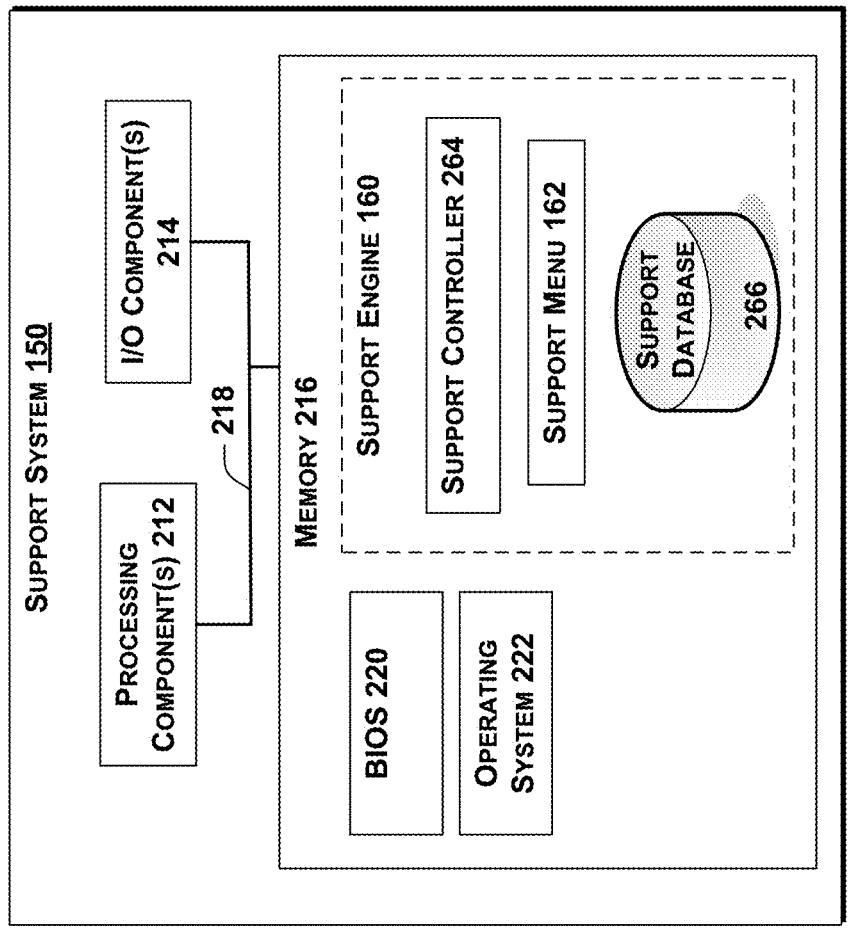
FIG. 2 shows an embodiment of a support server of FIG. 1.

FIG. 2 shows an embodiment of the support system 150 of FIG. 1. In this embodiment, the support system 150 includes one or more processing components 212 and one or more input/output (I/O) components 214 coupled to a memory 216 by a bus 218. The memory 216 includes a basic input/output system (BIOS) 220 that provides basic routines, including facilitating the transfer of information between elements within the support system 150, and an operating system 222 that manages and provides common services to the various elements of the support system 150.

As further shown in FIG. 2, the support system 150 further includes the support engine 160 stored within the memory 216. In at least some implementations, the support engine 160 includes a support controller 264, the support menu 162, and a support database 266. More specifically, in at least some implementations, the support engine 160 may include executable instructions that, when executed by the one or more processing components 212, perform one or more operations described herein for providing a smart support system in accordance with the present disclosure. In alternate implementations, the support engine 160 may be at least partially implemented using circuitry, such as using Application Specific Integrated Circuits (ASICs), Field Programmable Gate Arrays (FPGAs), or other suitable circuitry or components. In at least some implementations, when the one or more processing components 212 execute (or are configured to execute) the executable instructions of the support engine 160, then the one or more processing components 212 may become circuitry configured for performing one or more operations for providing a smart support system in accordance with the present disclosure, as described more fully below.

Figure 3:
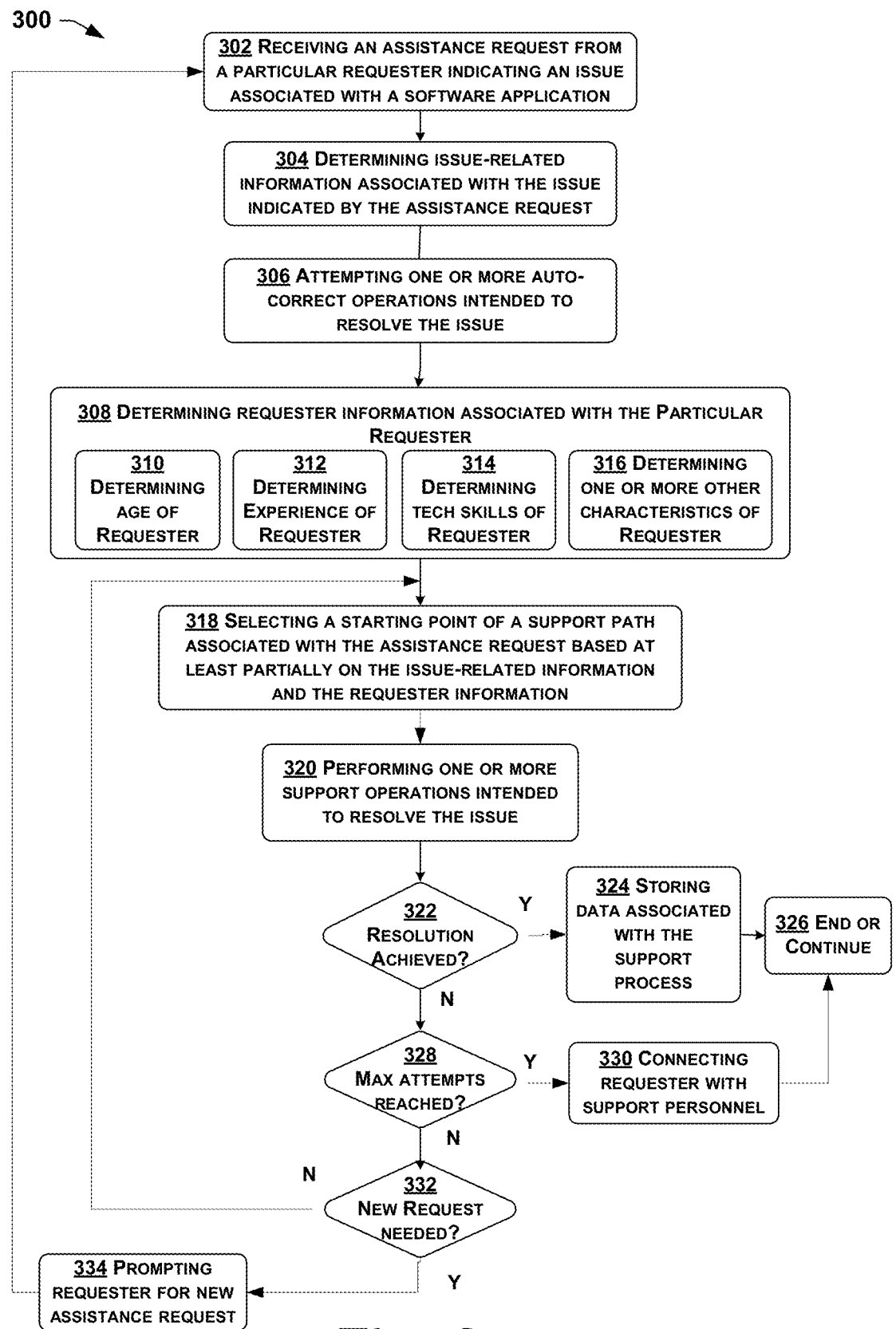
FIG. 3 shows an embodiment of a support process.

FIG. 3 shows an embodiment of a support process 300. In this embodiment, the support process 300 is described from the perspective of a support system (e.g. support system 150 of FIGS. 1 and 2). The support process 300 includes receiving an assistance request from a particular requester indicating an issue associated with a software application at 302. For example, in at least some implementations, the receiving (at 302) may include receiving a written request (e.g. email, text message, SMS (Short Messaging System) message, etc.), receiving input indicative of an audio request (e.g. spoken request, tonal code, etc.), receiving input indicative of a gesture-based request (e.g. wave, finger movement, etc.), or any other suitable form of request or combinations thereof.

In at least some implementations, the receiving of the assistance request (at 302) may include receiving an assistance request from a requester 102 requesting assistance with installation of a software application (e.g. crashing, failure to install etc.) or a run-time issue associated with the software application (e.g. run time errors, improper operation, crashing, etc.), an updating of the software application (e.g. implementing a patch, etc.), a de-installation of the software application, or any other suitable issue associated with the software application.

The support process 300 further includes determining issue-related information associated with the issue indicated by the assistance request at 304. For example, in at least some implementations, the determining issue-related information (at 304) includes determining the software application that the requester is requesting assistance about, determining the particular issue that the requester is having (e.g. installation, run time, de-installation, etc.), determining what error messages the requester may be receiving, determining other diagnostic information the requester may be able to provide, or any other suitable issue-related information. In at least some implementations, the issue-related information may be determined solely from the assistance request (received at 302). In other implementations, at least some of the issue-related information may be obtained from metadata that accompanies the assistance request (received at 302). In still further implementations, at least some of the issue-related information may be obtained (received from a push or pulled) from error logs, historical files, state data, tracking data, operating system information, or any other suitable sources or types of information received from the client device 110 or other suitable source. In at least some implementations, the determining of issue-related information (at 304) may occur passively, without the cooperation or involvement of the requestor (other than to prepare and send the assistance request), however, in other implementations, the determining of issue-related information (at 304) may be involve one or more prompts or queries for information to the particular requester in an iterative fashion. In still other implementations, at least some of the issue-related information may be determined from data stored within the support database 266, such as information obtained during one or more previous support sessions or support requests and stored for future use in the support database 266.

In at least some implementations, the support process 300 may include attempting one or more auto-correct operations intended to resolve the issue at 306. For example, attempting one or more auto-correct operations (at 306) may include transmitting one or more commands to change one or more settings or adjustments or inputs associated with the software application, or to change one or more settings or adjustments or inputs associated with an operating system of the client device 110, or to perform one or more preparatory or corrective operations intended to correct or resolve the issue experienced by the requestor, or any other suitable auto-correct operations.

As further shown in FIG. 3, the support process 300 further includes determining requester information associated with the particular requester at 308. For example, in at least some implementations, the determining requester information (at 308) includes determining an age of the particular requester at 310. In further implementations, determining requester information (at 308) includes determining an experience of the particular requester at 312 (e.g. an experience with the software application, an experience with operating the client device 110, an experience with computers in general, etc.). In at least some implementations, determining requester information (at 308) includes determining one or more technical skills of the particular requester at 314 (e.g. degree, certification, credential, training, etc.). And in further implementations, determining requester information (at 308) includes determining one or more other characteristics of the particular requester at 316 (e.g. previous instances or interactions with support system 150, demographic information, occupation, skill set, experience in using features, premium or regular user, social score, one or more other software applications operated by the particular requester, responses or inputs by the particular requester that indicate proficiency or lack thereof, etc.).

In at least some implementations, the determining of requester information (at 308) may occur passively, without the cooperation or involvement of the requestor (other than to prepare and send the assistance request), however, in other implementations, the determining of requester information (at 308) may be involve one or more prompts or queries for information to the particular requester in an iterative fashion. In still other implementations, at least some of the requester information may be determined (at 308) from data stored within the support database 266, such as information obtained during one or more previous support sessions or support requests and stored for future use in the support database 266.

Next, the support process 300 includes selecting a starting point of a support path associated with the assistance request based at least partially on the issue-related information and the requester information at 318. For example, in at least some implementations, the selecting of the starting point (at 318) includes matching at least a portion of the issue-related information and at least a portion of the requester information with stored data to select an optimal starting point for providing support. In at least some additional implementations, the selecting of the starting point (at 318) may include analyzing a text version of the assistance request 104 and/or the support information 108 to determine one or more keywords contained within the text version of the assistance request 104, and matching the one or more keywords contained within the text version of the assistance request 104 with one or more corresponding keywords of at least one possible intent stored within the support database 266 and associated with one or more channels 164 and/or one or more starting points 170a, 170b of the support menu 162.

Furthermore, in at least some implementations, the selecting a starting point (at 318) may include identifying from the issue-related information which software application (or portion or aspect of a software application) the requester is having an issue with, and/or the type of problem being encountered (e.g. installation, run-time, de-installation, etc.), in order to begin narrowing down the selection of which of the channels 164 of the support menu 162 is most appropriate to be selected. Then, in at least some implementations, the selecting the starting point (at 318) may include analyzing the requester information (e.g. age, proficiency of the requester, technical skills, experience, etc.) to further narrow down and intelligently select the starting point in the support menu 162 for providing support. For example, as shown in FIG. 1, in at least some implementations, the selecting of the starting point (at 318) may include the support engine 160 determining that the requestor 102 is relatively inexperienced and should be started at the starting point 170a in the support menu 170 that is appropriate for a relatively inexperienced user. Alternately, the selecting of the starting point (at 318) may include the support engine 160 determining that the requestor 102 can avoid several operations (or steps), and instead should begin at the starting point 170b that is appropriate for a more experienced or technically advanced requester. As noted above, the selecting of the starting point (at 318) may be based on a variety of requester information, including age, experience (e.g. experience with software application, experience with client device 110, experience with computers or electronic devices in general, etc.), technical skills of the particular requester (e.g. degree, certification, credential, training, etc.), or other characteristics of the particular requester (e.g. previous instances or interactions with support system 150, demographic information, one or more other software applications operated by the particular requester, responses or inputs by the particular requester that indicate proficiency or lack thereof, etc.).

As further shown in FIG. 3, after selecting the starting point (at 318), the support process 300 further includes performing one or more support operations intended to resolve the issue at 320. For example, in at least some implementations, the performing one or more support operations (at 320) includes the support engine 160 transmitting one or more instructions (e.g. instructions that are stored in the support database 266) to the client device 110 for the requester 102 to perform in an attempt to resolve the issue indicated by the assistance request 104. The support engine 160 may transmit one or more instructions for the requester 102 to perform in a serial or consecutive fashion, or alternately, the support engine 160 may transmit an instruction for the requester 102 to perform, receive feedback on the outcome of the performed instruction, and then transmit another instruction for the requester 102 to perform in an iterative or closed-loop fashion. In further implementations, the performing one or more support operations (at 320) may include a combination of serial instructions and iterative instructions performed by the requester 102 and, in at least some implementations, also by the client device 110 in an automated or semi-automated manner.

The support process 300 further includes determining whether resolution of the issue indicated by the assistance request has been achieved at 322. For example, in at least some implementations, the determining whether resolution of the issue has been achieved (at 322) may include presenting a query to the requester 102 and reviewing a response by the requester 102 to determine whether resolution of the issue has been achieved. Alternately, the determining whether resolution of the issue has been achieved (at 322) may include querying the client device 110 and reviewing information or signals received from the client device 110 that indicate whether resolution of the issue has been achieved. In still further implementations, the determining whether resolution of the issue has been achieved (at 322) may include a combination of one or more queries to the requester 102 and one or more queries to the client device 110.

With continued reference to FIG. 3, if it is determined that resolution of the issue has been achieved (at 322), then the support process 300 includes storing data associated with the support process at 324. For example, in at least some implementations, the storing data associated with the support process (at 324) may include storing at least a portion of the issue-related information, the requester information, the starting point, or any other suitable information in the support database 266 for accessing in one or more future instances of the process 300. More specifically, in at least some implementations, the storing data associated with the support process (at 324) may include storing or creating a user profile associated with the particular requester 102 within the support database 266 and that may include personal information or data that is specific to the requester 102 (e.g. name, account number, password, identification number, birth date, answers to security questions, etc.) that may be used by the support engine to respond to future requests for support (e.g. when determining requester information at 308, etc.). The process 300 may then end or continue to other operations at 326.

Alternately, if it is determined that resolution of the issue has not been achieved (at 322), then the support process 300 includes determining whether a maximum number of attempts to resolve the issue have been attempted at 328. For example, in at least some implementations, a maximum number of attempts may be set to five, six, eight, or any other desired value. If it is determined that the maximum number of attempts to resolve the issue has been reached (at 328), the support process 300 includes connecting the requester with support personnel at 330. For example, in at least some implementations, the connecting of the requester with support personnel (at 330) may include routing the requester's assistance request (received at 302) to one or more technical support persons 166 (FIG. 1) for live communication and assistance (e.g. via telephone, live chat, etc.). Alternately, in other implementations, the connecting of the requester with support personnel (at 330) may include providing directions to the requester 102 to visit a store, service center, or other brick and mortar facility that offers live support personnel who may provide support services intended to resolve the issue. After connecting the requester with support personnel (at 330), the process 300 may then end or continue to other operations at 326.

As further shown in FIG. 3, if it is determined that a maximum number of attempts has not been reached (at 328), the support process 300 includes determining whether a new request from the requester is needed at 332. If it is determined that no new request from the requester is needed (at 332), then the support process 300 returns to selecting the starting point of the support path at 318, and the support process 300 may reevaluate at least one of the issue-related information (determined at 304) or the requester information (determined at 308) in order to select a new starting point for attempting to resolve the issue indicated by the assistance request. For example, in at least some implementations, the support process 300 may include selecting a starting point that leads to a different channel 164 of the support menu 162 than what was previously attempted in one or more prior unsuccessful instances of the process 300. Alternately, the support process 300 may select a different starting point in the same channel 164 that was previously selected, such as a starting point that is more suitable for a requester that has less experience or less proficiency with the software application than was previously assumed in one or more prior unsuccessful instances of the process 300.

On the other hand, if it is determined that a new request from the requester is needed (at 332), then the support process 300 includes prompting the requester for a new assistance request at 334. For example, in at least some implementations, the prompting of the requester (at 334) may include querying the requester for a new or differently-worded description of the issue, or querying the requester for additional details regarding the issue, or may provide one or more suggested issue statements from which the requester may select a most appropriately-worded issue statement for resolution, or any other suitable prompts.

With continued reference to FIG. 3, after prompting the requester for a new assistance request (at 334), the support process 300 returns to receiving the assistance request (at 302), and the above-described operations 302 through 334 may be repeated indefinitely until the issue is resolved (at 322), or until the maximum number of attempts has been reached (at 328).

It will be appreciated that techniques and technologies for support systems are not necessarily limited to the particular embodiment of the support process 300 shown in FIG. 3. In at least some implementations, one or more of the various operations of the support process 300 may be eliminated or combined with other operations. Similarly, in at least some implementations, one or more of the various operations may be performed in a different order or sequence than is described above and shown in FIG. 3 to provide still further embodiments of support processes.

Techniques and technologies for support systems in accordance with the present disclosure may provide considerable advantages over conventional systems. For example, in at least some implementations, techniques and technologies for support systems as disclosed herein may improve efficiency of support systems by appropriately tailoring the provision of support to the expertise and personal characteristics of the requester. Because the starting point within the support menu is appropriately selected based on information characterizing the requester (e.g. age, proficiency of the requester, etc.), the starting point may be selected to reduce or eliminate one or more operations that may are unnecessary for resolution of the issue. In this way, resolution of the issue may be achieved more quickly and efficiently, and processing resources expended by the support system (e.g. support server 152) or the client device (e.g. device 110), or both, may be substantially reduced, in comparison with conventional support systems. More specifically, the processing burden and energy consumption expended by the support system (e.g. support server 152) or the client device (e.g. device 110), or both, may be substantially reduced. Thus, techniques and technologies for support systems in accordance with the present disclosure may reduce energy consumption, reduce wear-and-tear, and may extend the useful life of various components (e.g. batteries, etc.) of the support system and/or client device since support operations may be performed more efficiently and effectively. In addition, requesters may experience improved satisfaction with support systems that employ techniques and technologies in accordance with the present disclosure due, for example, to the increased simplicity and improved time savings provided by embodiments in accordance with the present disclosure.

In general, techniques and technologies disclosed herein for support systems may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including specialty computing devices, hand-held devices, consumer electronics, etc. In addition, various embodiments of the invention may also be practiced in distributed computing environments (e.g. cloud-based computing systems) where tasks are performed by remote-processing devices that are linked through a communications network.

Figure 4:
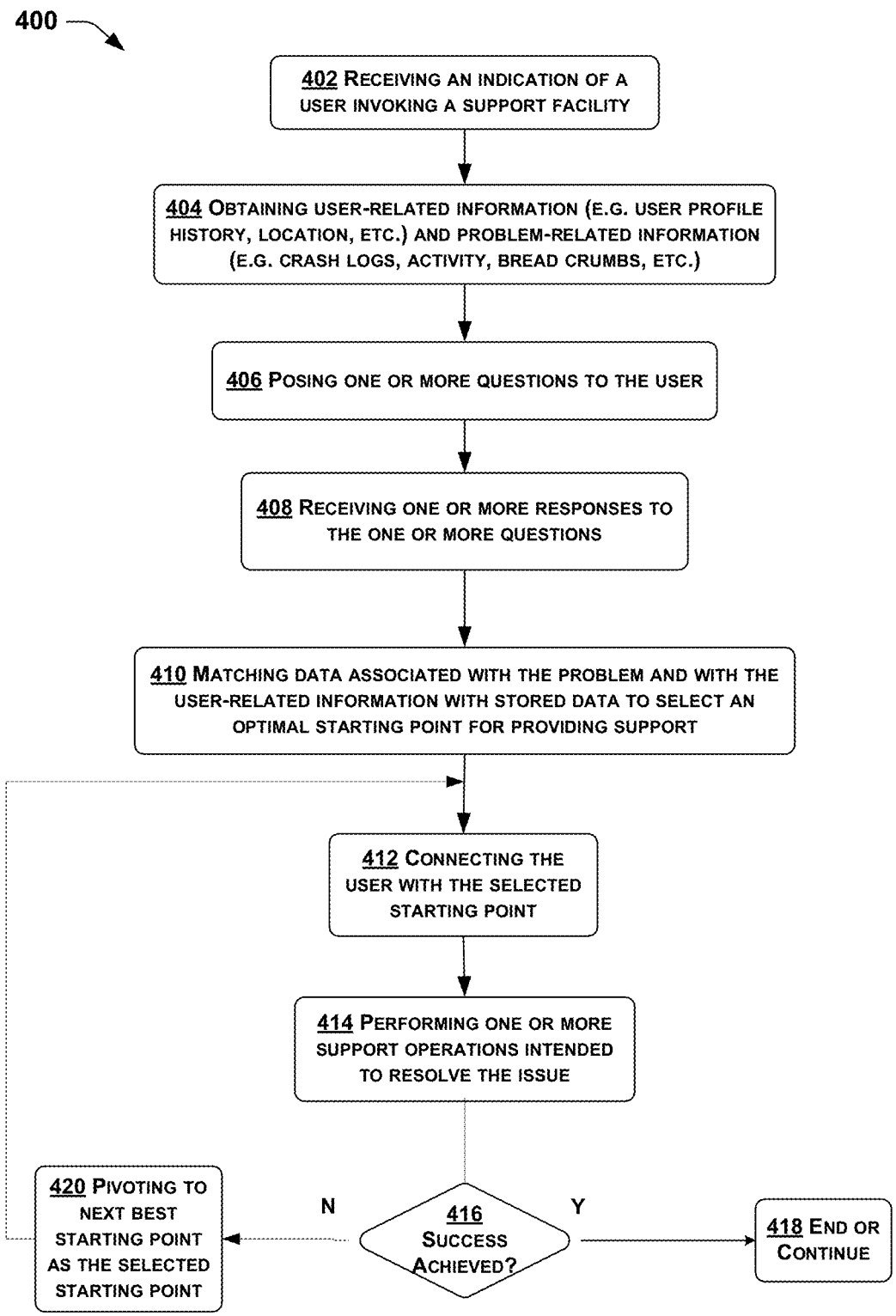
FIG. 4 shows another embodiment of a support process.

Again, it should be appreciated that techniques and technologies for caller assistance systems are not necessarily limited to the particular embodiments described above. For example, FIG. 4 shows another embodiment of a support process 400 in accordance with the present disclosure. In this embodiment, the support process 400 is described from the perspective of a support system (e.g. support system 150 of FIGS. 1 and 2).

In the embodiment shown in FIG. 4, the support process 400 includes receiving an indication of a user invoking a support facility at 402. For example, in at least some implementations, the support system may receive (at 402) an indication that the user has clicked a support button to request assistance with a problem the user is experiencing. At 404, the support process 400 includes obtaining user-related information (e.g. user profile history, location, etc.) and problem-related information (e.g. crash logs, activity logs, bread crumbs, etc.).

The support process 400 further includes posing one or more questions to the user at 406. For example, in some implementations, the support system 150 may pose one or more questions to the requester 102 to obtain additional details about the problem not determined during the obtaining of the issue-related information (at 404). In further implementations, the support system 150 may pose one or more questions to the requester 102 to obtain additional details about the user not determined during the obtaining of the user-related information (at 404).

As further shown in FIG. 4, the support process 400 further includes matching data associated with the problem and with the user-related information with stored data to select an optimal starting point for providing support at 410.

For example, in at least some implementations, the matching operations (at 410) may be performed by an optimization engine of the support system. In further implementations, the matching operations (at 410) may be performed by one or more optimization algorithms (or optimization instructions) performed by the support controller 264 of the support engine 160. In at least some implementations, the stored data may include empirical data obtained from one or more previous support operations and stored in the support database 266. In further implementations, the stored data may be theoretical or predicted data that is pre-determined and pre-stored within the support database 266 during development of the support system 150. As noted above, in at least some implementations, the matching operations to select the starting point (at 410) may include the support engine 160 determining that the requestor 102 is relatively inexperienced and should be started at the starting point 170a in the support menu 170 that is appropriate for a relatively inexperienced user. Alternately, the matching operations to select the starting point (at 410) may include the support engine 160 determining that the requestor 102 can avoid several operations (or steps), and instead should begin at the starting point 170b that is appropriate for a more experienced or technically advanced requester. In at least some implementations, the matching operations to select the starting point (at 410) may be based on a variety of requester information, including age, experience (e.g. experience with software application, experience with client device 110, experience with computers or electronic devices in general, etc.), technical skills of the particular requester (e.g. degree, certification, credential, training, etc.), or other characteristics of the particular requester (e.g. previous instances or interactions with support system 150, demographic information, one or more other software applications operated by the particular requester, responses or inputs by the particular requester that indicate proficiency or lack thereof, etc.).

The support process 400 further includes connecting the user with the selected starting point at 412. In at least some implementations, the connecting of the user with the selected starting point (at 412) may include connecting the user to a selected starting point 170a in the support menu 170 that is appropriate for a relatively inexperienced user, while in other implementations, the connecting of the user with the selected starting point (at 412) may include connecting the user to a selected starting point 170b that is appropriate for a more experienced or technically advanced requester.

As further shown in FIG. 4, the support process 400 further includes performing one or more support operations intended to resolve the issue at 414. As noted above, in at least some implementations, the performing one or more support operations (at 414) includes the support engine 160 transmitting one or more instructions to the client device 110 for the user (e.g. requester 102) to perform in a serial or consecutive fashion, or alternately, the support engine 160 may transmit an instruction for the user to perform, receive feedback on the outcome of the performed instruction, and then transmit another instruction for the user to perform in an iterative or closed-loop fashion (or a combination of serial and iterative instructions).

The support process 400 further includes determining whether success has been achieved at 416. If it is determined that success has been achieved (at 416) (i.e. the user's problem has been resolved), then the support process 400 ends or continues to other operations at 418. On the other hand, if it is determined that success has not been achieved (at 416), then the support process 400 includes pivoting to the next best starting point as the selected starting point at 420. The support process 400 may then return to connecting the user with the selected starting point at 412 (using the next best starting point as the selected starting point) and may repeat the above-described operations 412 through 416 until success has been achieved (at 416) and the user's problem has been satisfactorily resolved. Once the user's problem has been successfully resolved (i.e. success achieved at 416), the support process 400 ends or continues to other operations (at 418).

Figure 5:
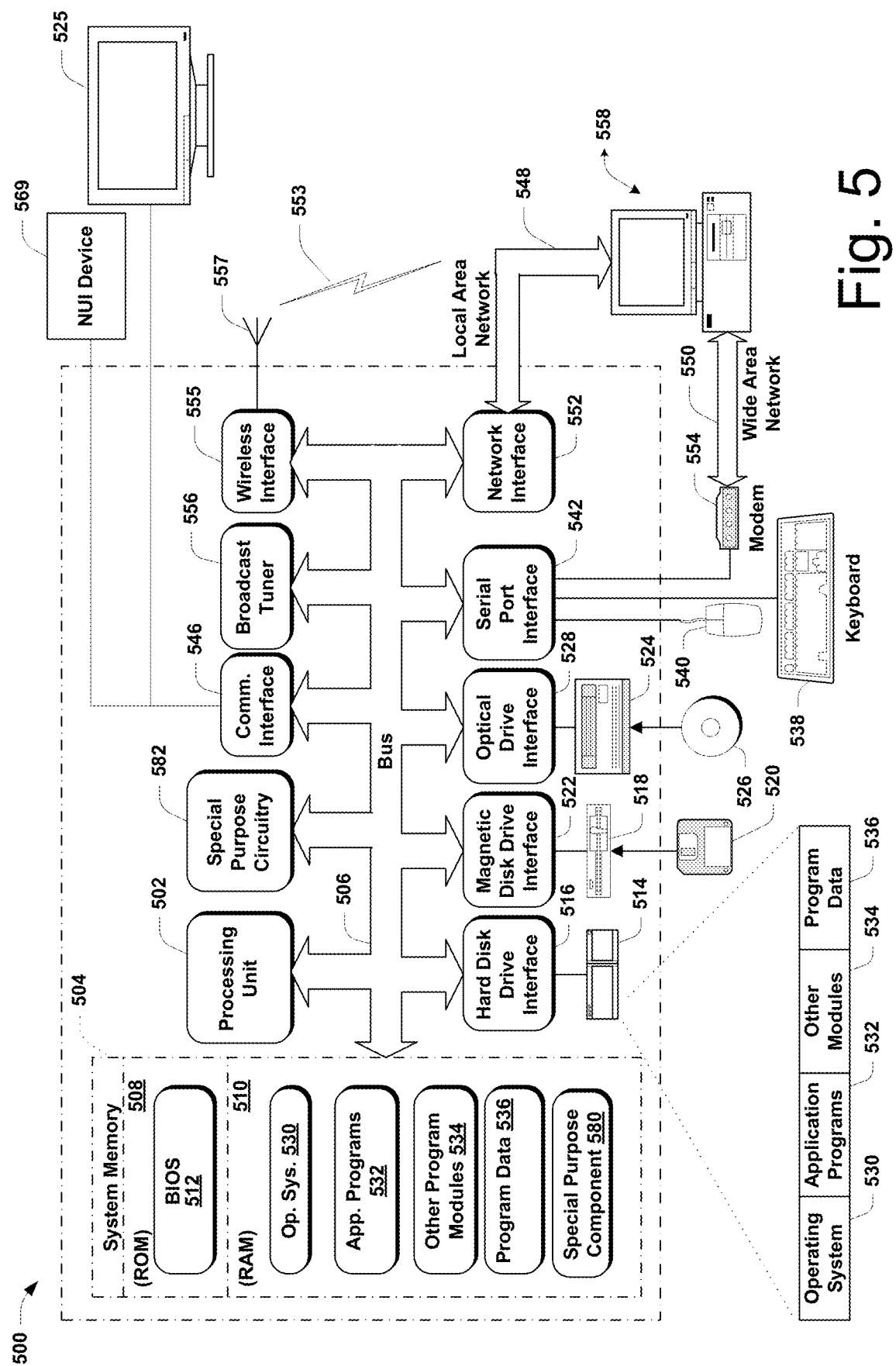
FIG. 5 shows an embodiment of a computing device environment for a smart support system.

FIG. 5 shows an embodiment of a computing device environment 500 for a smart support system in accordance with the present disclosure. As shown in FIG. 5, the example computer system environment 500 includes one or more processors (or processing units) 502, special purpose circuitry 582, memory 504, and a bus 506 that operatively couples various system components, including the memory 504, to the one or more processors 502 and special purpose circuitry 582 (e.g., Application Specific Integrated Circuitry (ASIC), Field Programmable Gate Array (FPGA), etc.).

The bus 506 may represent one or more of any of several types of bus structures, including a memory bus or memory controller, a peripheral bus, an accelerated graphics port, and a processor or local bus using any of a variety of bus architectures. In at least some implementations, the memory 504 includes read only memory (ROM) 508 and random access memory (RAM) 510. A basic input/output system (BIOS) 512, containing the basic routines that help to transfer information between elements within the system 500, such as during start-up, is stored in ROM 508.

The example system environment 500 further includes a hard disk drive 514 for reading from and writing to a hard disk (not shown), and is connected to the bus 506 via a hard disk driver interface 516 (e.g., a SCSI, ATA, or other type of interface). A magnetic disk drive 518 for reading from and writing to a removable magnetic disk 520, is connected to the system bus 506 via a magnetic disk drive interface 522. Similarly, an optical disk drive 524 for reading from or writing to a removable optical disk 526 such as a CD ROM, DVD, or other optical media, connected to the bus 506 via an optical drive interface 528. The drives and their associated computer-readable media may provide nonvolatile storage of computer readable instructions, data structures, program modules and other data for the system environment 500. Although the system environment 500 described herein employs a hard disk, a removable magnetic disk 520 and a removable optical disk 526, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 500 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 5, a number of program modules may be stored on the memory 504 (e.g., the ROM 508 or the RAM 510) including an operating system 530, one or more application programs 532, other program modules 534, and program data 536 (e.g., the data store 520, image data, audio data, three dimensional object models, etc.). Alternately, these program modules may be stored on other computer-readable media, including the hard disk, the magnetic disk 520, or the optical disk 526. For purposes of illustration, programs and other executable program components, such as the operating system 530, are illustrated in FIG. 5 as discrete blocks, although it is recognized that such programs and components reside at various times in different storage components of the system environment 500, and may be executed by the processor(s) 502 or the special purpose circuitry 582 of the system environment 500.

A user may enter commands and information into the system environment 500 through input devices such as a keyboard 538 and a pointing device 540. Other input devices (not shown) may include a microphone, joystick, game pad, satellite dish, scanner, or the like. Still other input devices, such as a Natural User Interface (NUI) device 569, or user interface 525, include or involve one or more aspects of a Natural User Interface (NUI) that enables a user to interact with the system environment 500 in a "natural" manner, free from artificial constraints imposed by conventional input devices such as mice, keyboards, remote controls, and the like. For example, in at least some embodiments, the NUI device 569 may rely on speech recognition, touch and stylus recognition, one or more biometric inputs, gesture recognition both on screen and adjacent to the screen, air gestures (e.g. hand movement, wave, point, snap, nod, finger gesture, etc.), head and eye (or gaze) tracking, voice and speech, vision, touch, hover (e.g. maintaining position of finger or stylus proximate to a relevant portion of an interface or other location for a specified period, etc.), facial or body gestures, machine intelligence (e.g. pattern recognition, Bayesian learning algorithms, inductive learning algorithms, inference algorithms, etc.), as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

These and other input devices are connected to the processing unit 502 and special purpose circuitry 582 through an interface 542 or a communication interface 546 (e.g. video adapter) that is coupled to the system bus 506. A user interface 525 (e.g., display, monitor, or any other user interface device) may be connected to the bus 506 via an interface, such as a video adapter 546. In addition, the system environment 500 may also include other peripheral output devices (not shown) such as speakers and printers.

The system environment 500 may operate in a networked environment using logical connections to one or more remote computers (or servers) 558. Such remote computers (or servers) 558 may be a personal computer, a server, a router, a network PC, a peer device or other common network node. The logical connections depicted in FIG. 5 include one or more of a local area network (LAN) 548 and a wide area network (WAN) 550. Such networking environments are commonplace in offices, enterprise-wide computer networks, intranets, and the Internet. In this embodiment, the system environment 500 also includes one or more broadcast tuners 556. The broadcast tuner 556 may receive broadcast signals directly (e.g., analog or digital cable transmissions fed directly into the tuner 556) or via a reception device (e.g., via an antenna 557, a satellite dish, etc.).

When used in a LAN networking environment, the system environment 500 may be connected to the local area network 548 through a network interface (or adapter) 552. When used in a WAN networking environment, the system environment 500 typically includes a modem 554 or other means (e.g., router) for establishing communications over the wide area network 550, such as the Internet. The modem 554, which may be internal or external, may be connected to the bus 506 via the serial port interface 542. Similarly, the system environment 500 may exchange (send or receive) wireless signals 553 with one or more remote devices using a wireless interface 555 coupled to a wireless communicator 557 (e.g., an antenna, a satellite dish, a transmitter, a receiver, a transceiver, a photoreceptor, a photodiode, an emitter, a receptor, etc.).

In a networked environment, program modules depicted relative to the system environment 500, or portions thereof, may be stored in the memory 504, or in a remote memory storage device. More specifically, as further shown in FIG. 5, a special purpose component 580 may be stored in the memory 504 of the system environment 500. The special purpose component 580 may be implemented using software, hardware, firmware, or any suitable combination thereof. In cooperation with the other components of the system environment 500, such as the processing unit 502 or the special purpose circuitry 582, the special purpose component 580 may be operable to perform one or more implementations of techniques and technologies described above (e.g., FIGS. 1-4).

Generally, application programs and program modules executed on the system environment 500 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

In view of the disclosure of techniques and technologies for caller assistance systems as disclosed herein, a few representative embodiments are summarized below. It should be appreciated that the representative embodiments described herein are not intended to be exhaustive of all possible embodiments, and that additional embodiments may be readily conceived from the disclosure of techniques and technologies provided herein.

For example, in at least some implementations, a system configured to provide support in response to requests for assistance, comprises: a processing component operatively coupled to a memory; a support engine at least partially stored on the memory, the support engine including one or more instructions executable by the processing component configured to perform one or more operations including at least: receiving an assistance request indicating an issue associated with a software application operating on a client device, the assistance request being associated with a particular requester attempting to address the issue associated with the software application; determining issue-related information associated with the issue indicated by the assistance request associated with the software application; determining requester information associated with the particular requester including at least one of an age of the particular requester or at least one indication of proficiency of the particular requester with operation of the software application; and selecting a starting point of a support path associated with the assistance request based at least partially on the issue-related information and the requestor information including at least one of an age of the particular requester or at least one indication of proficiency of the particular requester with operation of the software application, the support path defining one or more operations to be performed to provide at least one support solution responsive to the assistance request.

In at least some embodiments, receiving an assistance request indicating an issue associated with a software application operating on a client device comprises: receiving at least one of a written request, a Short Message System (SMS) message, a text message, an audible request, or a spoken request. In further embodiments, determining issue-related information associated with the issue indicated by the assistance request associated with the software application comprises: determining issue-related information associated with the issue indicated by the assistance request from at least one of a crash log, an activity log, a bread crumb, an error log, a historical file, state data, tracking data, or operating system information.

In addition, in at least some embodiments, determining requester information associated with the particular requester including at least one of an age of the particular requester or at least one indication of proficiency of the particular requester with operation of the software application comprises: determining an age of the particular requester and at least one indication of proficiency of the particular requester with operation of the software application. Alternately, in at least some embodiments, determining requester information associated with the particular requester including at least one of an age of the particular requester or at least one indication of proficiency of the particular requester with operation of the software application comprises: determining at least one indication of proficiency of the particular requester with operation of the software application.

In still further embodiments, determining at least one indication of proficiency of the particular requester with operation of the software application comprises: determining at least one indication of skill of the particular requester associated with operation of the software application. In additional embodiments, determining at least one indication of proficiency of the particular requester with operation of the software application comprises: determining at least one of a degree, a certification, a credential, or a training of the particular requester associated with operation of the software application. In some other embodiments, determining at least one indication of proficiency of the particular requester with operation of the software application comprises: determining at least one of a degree of proficiency of the particular requester based on one or more responses by the particular requester to one or more queries associated with operation of the software application.

Additionally, in at least some embodiments, selecting a starting point of a support path associated with the assistance request based at least partially on the issue-related information and the requestor information including at least one of an age of the particular requester or at least one indication of proficiency of the particular requester with operation of the software application comprises: determining that the particular requester is relatively inexperienced with operation of the software application; and selecting a starting point of a support path associated with the assistance request that is appropriate for a relatively inexperienced requester that involves one or more additional operations compared with an alternate starting point of the support path that is appropriate for a relatively experienced requester.

Alternately, in some embodiments, selecting a starting point of a support path associated with the assistance request based at least partially on the issue-related information and the requestor information including at least one of an age of the particular requester or at least one indication of proficiency of the particular requester with operation of the software application comprises: determining that the particular requester is relatively experienced with operation of the software application; and selecting a starting point of a support path associated with the assistance request that is appropriate for a relatively experienced requester that involves one or more fewer operations compared with an alternate starting point of the support path that is appropriate for a relatively inexperienced requester.

In at least some additional embodiments, selecting a starting point of a support path associated with the assistance request based at least partially on the issue-related information and the requestor information including at least one of an age of the particular requester or at least one indication of proficiency of the particular requester with operation of the software application comprises: matching at least a portion of the issue-related information and at least a portion of the requester information with stored data to select an optimal starting point for providing support. In further embodiments, matching at least a portion of the issue-related information and at least a portion of the requester information with stored data to select an optimal starting point for providing support comprises: matching using one or more optimization algorithms at least a portion of the issue-related information and at least a portion of the requester information with stored data to select an optimal starting point for providing support. And in still further embodiments, matching at least a portion of the issue-related information and at least a portion of the requester information with stored data to select an optimal starting point for providing support comprises: matching using one or more optimization algorithms at least a portion of the issue-related information and at least a portion of the requester information with stored data to select an optimal starting point for providing support, the stored data including at least some empirical data obtained from one or more previous support operations.

In addition, in at least some embodiments, a system configured for providing support, comprises: circuitry configured to receive an indication of a user invoking a support facility due to a problem experienced with a software application; circuitry configured for obtaining user-related information including at least one of an age of the user or at least one indication of proficiency of the user with operation of the software application; circuitry configured for obtaining problem-related information related to the problem experienced with the software application; and circuitry configured for selecting a starting point of a support path based at least partially on the problem-related information and the user-related including at least one of an age of the user or at least one indication of proficiency of the user with operation of the software application, the support path defining one or more operations intended to address the problem experienced with the software application.

In at least some alternate embodiments, circuitry configured for obtaining problem-related information related to the problem experienced with the software application comprises: circuitry configured for obtaining problem-related information related to the problem experienced with the software application from at least one of a crash log, an activity log, a bread crumb, an error log, a historical file, state data, tracking data, or operating system information. In further embodiments, circuitry configured for obtaining user-related information including at least one of an age of the user at least one indication of proficiency of the user with operation of the software application comprises: circuitry configured for obtaining user-related information including an age of the user and at least one indication of proficiency of the user with operation of the software application.

In at least some additional embodiments, circuitry configured for obtaining user-related information including at least one of an age of the user at least one indication of proficiency of the user with operation of the software application comprises: determining at least one indication of skill of the particular requester associated with operation of the software application. In further embodiments, circuitry configured for selecting a starting point of a support path based at least partially on the problem-related information and the user-related including at least one of an age of the user or at least one indication of proficiency of the user with operation of the software application comprises: circuitry configured for matching at least a portion of the issue-related information and at least a portion of the user-related information with stored data to select an optimal starting point for providing support.

Alternately, in some embodiments, circuitry configured for matching at least a portion of the issue-related information and at least a portion of the user-related information with stored data to select an optimal starting point for providing support comprises: circuitry configured for matching using one or more optimization algorithms at least a portion of the issue-related information and at least a portion of the requester information with stored data to select an optimal starting point for providing support, the stored data including at least some theoretical data or predicted data.

In still further embodiments, a method of providing support, comprises: receiving an indication of a user invoking a support facility due to a problem experienced with a software application; obtaining user-related information including an age of the user and at least one indication of proficiency of the user with operation of the software application; obtaining problem-related information related to the problem experienced with the software application; and selecting a starting point of a support path based at least partially on the problem-related information and the user-related including at least one of an age of the user or at least one indication of proficiency of the user with operation of the software application, the support path defining one or more operations intended to address the problem experienced with the software application.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A system configured to provide support in response to requests for assistance, comprising:
   a processing component operatively coupled to a memory and configured to perform one or more operations including at least:
      receiving an assistance request indicating an issue associated with a software application operating on a client device, the assistance request being associated with a particular requester attempting to address the issue associated with the software application;
      determining issue-related information associated with the issue indicated by the assistance request associated with the software application;
      determining requester information associated with the particular requester, the requester information including at least one technical skill of the particular requester;
      selecting, from a support path defining a plurality of linked steps to be performed to provide at least one support solution responsive to the assistance request, one of the plurality of linked steps as a starting point of the support path associated with the assistance request based at least partially on the issue-related information and the requestor information; and
      as a response to the assistance request, routing the requester to the selected starting point within the plurality of linked steps, wherein steps of the plurality of linked steps occurring prior to the starting point are avoided.

2. The system of claim 1, wherein receiving an assistance request indicating an issue associated with a software application operating on a client device comprises:
   receiving at least one of a written request, a Short Message System (SMS) message, a text message, an audible request, or a spoken request.

3. The system of claim 1, wherein determining issue-related information associated with the issue indicated by the assistance request associated with the software application comprises:
   determining issue-related information associated with the issue indicated by the assistance request from at least one of a crash log, an activity log, a bread crumb, an error log, a historical file, state data, tracking data, or operating system information.

4. The system of claim 1, wherein the at least one technical skill of the particular requester includes at least one technical skill selected from a group consisting of
   a degree, a certification, a credential, and a training of the particular requester.

5. The system of claim 1, wherein the requester information further includes at least one indication of proficiency of the particular requester with operation of the software application and wherein determining the at least one indication of proficiency of the particular requester with operation of the software application comprises:
   determining at least one of a degree of proficiency of the particular requester based on one or more responses by the particular requester to one or more queries associated with operation of the software application.

6. The system of claim 1, wherein selecting the starting point of the support path associated with the assistance request based at least partially on the issue-related information and the requestor information comprises:
   determining that the particular requester is relatively inexperienced with operation of the software application; and
   selecting an optional starting point of the support path associated with the assistance request that is appropriate for a relatively inexperienced requester that results in the support path having one or more additional linked steps compared with selecting an alternate starting point of the support path that is appropriate for a relatively experienced requester.

7. The system of claim 1, wherein selecting the starting point of the support path associated with the assistance request based at least partially on the issue-related information and the requestor information comprises:
   determining that the particular requester is relatively experienced with operation of the software application; and
   selecting an optimal starting point of the support path associated with the assistance request that is appropriate for a relatively experienced requester that results in the support path having one or more fewer linked steps compared with an alternate starting point of the support path that is appropriate for a relatively inexperienced requester.

8. The system of claim 1, wherein selecting the starting point of the support path associated with the assistance request based at least partially on the issue-related information and the requestor information comprises:
   matching at least a portion of the issue-related information and at least a portion of the requester information with stored data to select an optimal starting point for providing support.

9. The system of claim 8, wherein matching at least a portion of the issue-related information and at least a portion of the requester information with stored data to select the optimal starting point for providing support comprises:
   matching using one or more optimization algorithms at least a portion of the issue-related information and at least a portion of the requester information with the stored data to select the optimal starting point for providing support.

10. The system of claim 8, wherein matching at least a portion of the issue-related information and at least a portion of the requester information with stored data to select the optimal starting point for providing support comprises:
   matching using one or more optimization algorithms at least a portion of the issue-related information and at least a portion of the requester information with the stored data to select the optimal starting point for providing support, the stored data including at least some empirical data obtained from one or more previous support operations.

11. The system of claim 1, wherein the requester information further includes an age of the particular requester.

12. The system of claim 1, wherein the requester information further includes an age of the particular requester and at least one indication of proficiency of the particular requester with operation of the software application.

13. A system configured for providing support, comprising:
   circuitry configured to receive an indication of a user invoking a support facility due to a problem experienced with a software application;
   circuitry configured for obtaining user-related information, the user-related information including at least one technical skill of the user;
   circuitry configured for obtaining problem-related information related to the problem experienced with the software application;
   circuitry configured for selecting, from a support path defining a plurality of linked steps to be performed to provide at least one support solution responsive to the indication of the user invoking the support facility due to the problem experienced with the software application, one of the plurality of linked steps a starting point of the support path based at least partially on the problem-related information and the user-related information; and
   circuitry configured for, as a response to the assistance request, routing the requestor to the starting point within the plurality of linked steps, wherein steps of the plurality of linked steps occurring prior to the starting point are avoided.

14. The system of claim 13, wherein circuitry configured for obtaining problem-related information related to the problem experienced with the software application comprises:
   circuitry configured for obtaining problem-related information related to the problem experienced with the software application from at least one of a crash log, an activity log, a bread crumb, an error log, a historical file, state data, tracking data, or operating system information.

15. The system of claim 13, wherein circuitry configured for selecting the starting point of the support path based at least partially on the problem-related information and the user-related information comprises:
   circuitry configured for matching at least a portion of the issue-related information and at least a portion of the user-related information with stored data to select an optimal starting point for providing support.

16. The system of claim 15, wherein circuitry configured for matching at least a portion of the issue-related information and at least a portion of the user-related information with the stored data to select the optimal starting point for providing support comprises:
   circuitry configured for matching using one or more optimization algorithms at least a portion of the issue-related information and at least a portion of the requester information with the stored data to select the optimal starting point for providing support, the stored data including at least some theoretical data or predicted data.

17. The system of claim 13, wherein the user-related information further includes an age of the user.

18. The system of claim 13, wherein the user-related information further includes at least one indication of proficiency of the user with operation of the software application.

19. The system of claim 13, wherein the user-related information further includes an age of the user and at least one indication of proficiency of the user with operation of the software application.

20. A method of providing support, comprising:
   receiving an indication of a user invoking a support facility due to a problem experienced with a software application;
   obtaining user-related information including an age of the user, at least one indication of proficiency of the user with operation of the software application, and at least one technical skill of the user;
   obtaining problem-related information related to the problem experienced with the software application;
   selecting, from a support path defining a plurality of linked steps to be performed to provide at least one support solution responsive to the indication of the user invoking the support facility due to the problem experienced with the software application, one of the plurality of linked steps as a starting point of the support path based at least partially on the problem-related information and the user-related information; and as a response to the assistance request, routing the requestor to the starting point within the plurality of linked steps, wherein steps of the plurality of linked steps occurring prior to the starting point are avoided.

* * * * *